US008621205B2

(12) United States Patent
Hubbell et al.

(10) Patent No.: US 8,621,205 B2
(45) Date of Patent: Dec. 31, 2013

(54) CERTIFICATE REMOTING AND RECOVERY

(75) Inventors: Steven Quentin Hubbell, Seattle, WA (US); Frank Byrum, Seattle, WA (US); Ladislau Conceicao, Redmond, WA (US); Trevor William Freeman, Sammamish, WA (US); Jeffrey Brian Kay, Bellevue, WA (US); Matthias Leibmann, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 12/704,791

(22) Filed: Feb. 12, 2010

(65) Prior Publication Data

US 2011/0202759 A1  Aug. 18, 2011

(51) Int. Cl.
*H04L 29/06* (2006.01)
(52) U.S. Cl.
USPC ......................................................... 713/156
(58) Field of Classification Search
USPC ......................................................... 713/156
See application file for complete search history.

(56) References Cited

U.S. PATENT DOCUMENTS

| | | | | |
|---|---|---|---|---|
| 6,128,740 | A | 10/2000 | Curry et al. | 713/158 |
| 6,233,341 | B1 | 5/2001 | Riggins | 380/277 |
| 6,842,449 | B2 | 1/2005 | Hardjono | 370/352 |
| 8,261,342 | B2 * | 9/2012 | Newman | 726/15 |
| 2002/0178356 | A1 | 11/2002 | Mattila | 713/156 |
| 2005/0081029 | A1 | 4/2005 | Thornton et al. | 713/156 |
| 2005/0085931 | A1 * | 4/2005 | Willeby | 700/89 |
| 2007/0101025 | A1 * | 5/2007 | Brown et al. | 709/248 |
| 2007/0277013 | A1 * | 11/2007 | Rexha et al. | 711/164 |
| 2011/0126002 | A1 * | 5/2011 | Fu et al. | 713/156 |

OTHER PUBLICATIONS

MSDN; "*Cryptographic Network Services*"; Microsoft Corporation Windows XP Embedded SP2 Feature Pack 2007; Oct. 18, 2006; 1 pg.
Java.Sun.com; "*keytool—Key and Certificate Management Tool*"; accessed from: http://java.sun.com/j2se/1.4.2/docs/tooldocs/windows/keytool.html; 2002; 14 pgs.
Oracle; "*13 Managing Wallets and Certificates*"; Oracle® Application Server Administrator's Guide—10g Release 2 (10.1.2); 2002, 2004; 31 pgs.
Technology for Information Environment Security: TIES Project Report; "*JISC Authentication, Authorisation and Accounting (AAA) Programme*"; accessed from http://joinup.ac.uk/projects/ties/ties_23-9.pdf on Dec. 2, 2009; 69 pgs.
McCune.cc; "*What's New in PGP?*"; accessed from http://www.mccune.cc/PGPnew.txt on Dec. 3, 2009; 15 pgs.
Cooper, D., et al.; "*Internet X509 Public Key Infrastructure Certificate and Certificate Revocation List (CRL) Profile*"; RFC 5280; May 2008; 152 pgs.

* cited by examiner

*Primary Examiner* — Kambiz Zand
*Assistant Examiner* — Ghodrat Jamshidi
(74) *Attorney, Agent, or Firm* — Merchant & Gould

(57) ABSTRACT

Certificate remoting and recovery may be provided. A computer may identify required security certificates and determine whether at least one required security certificate is not available. If the certificate is not available, the computer may identify a peer server and request the missing certificate from the peer server. The computer may also be operative to receive certificate management instructions from other computers.

20 Claims, 4 Drawing Sheets

CERTIFICATE REMOTING AND RECOVERY

BACKGROUND

Certificate remoting and recovery is a process for managing a certificate collection via a remote interface. In some situations, security certificates stored on a computer cannot be remotely administered. For example, certificates must be manually added, removed, or revoked by an administrator with physical access to the computer. Further, services executing on the computer may be unable to retrieve certificates needed to operate. For example, a federation service that validates transactions between two computers may be unable to retrieve a required authentication authority's security certificate. Thus, the conventional strategy is for an administrator to manually install and manage required certificates. This often causes problems because the conventional strategy does not allow efficient management of certificates across multiple computers. For example, an administrator may have to physically interact with computers in diverse geographic locations in order to make sure all have up-to-date certificates.

SUMMARY

Certificate remoting and recovery may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Certificate remoting and recovery may be provided. A computer may identify required security certificates and determine whether at least one required security certificate is not available. If the certificate is not available, the computer may identify a peer server and request the missing certificate from the peer server. The computer may also be operative to receive certificate management instructions from other computers.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
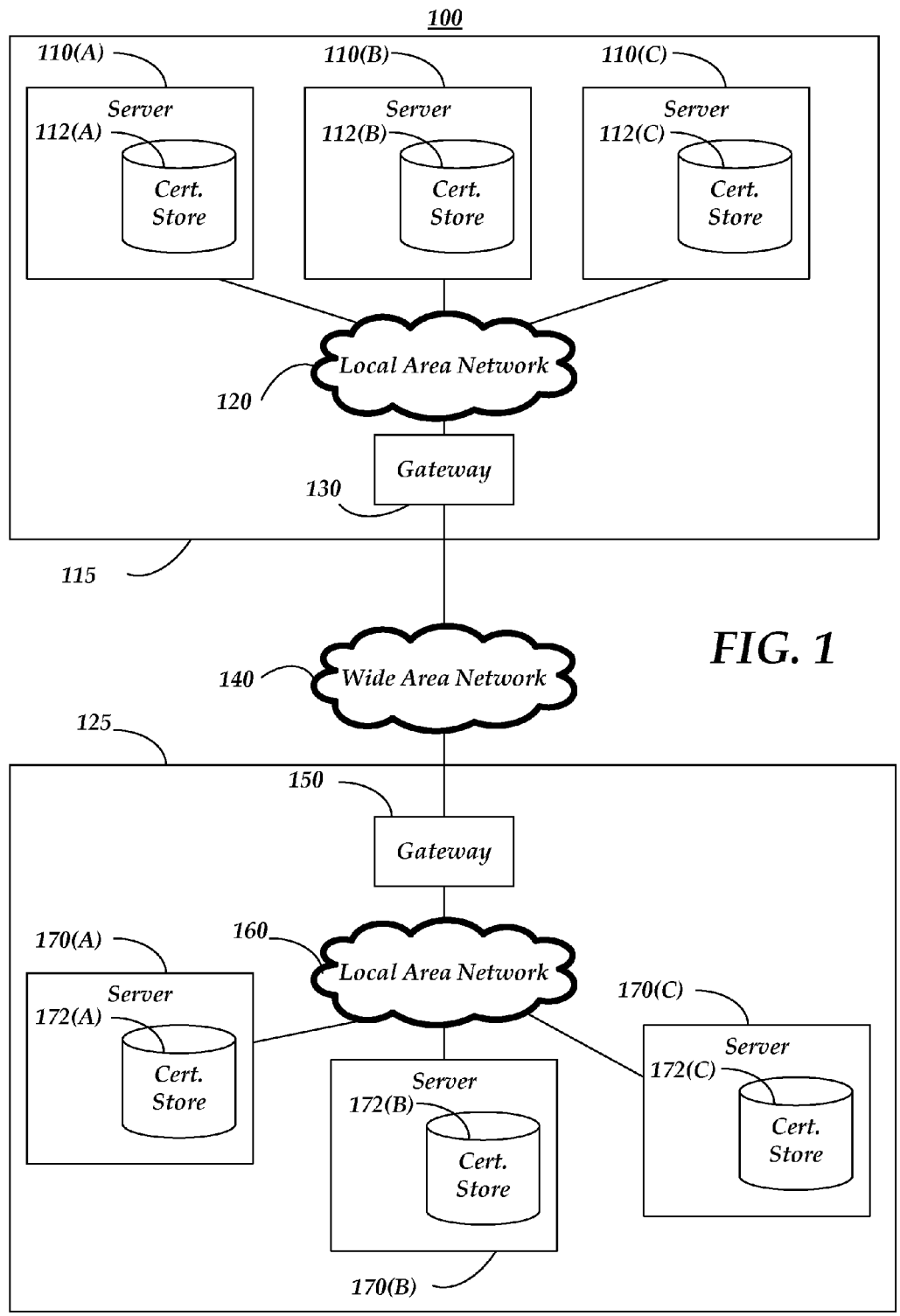
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Certificate remoting and recovery may be provided. Consistent with embodiments of the present invention, an interface may be provided that may allow remote manipulation of a computer's certificate store. The certificate store may comprise a plurality of security certificates, such as certificates compatible with the X.509 standard published as RFC 5280. Each certificate may comprise a public and/or a private key associated with an entity such as an application, a service, an organization, a federating authority, a computer, and/or an individual, and may be used to authenticate transactions with the associated entity. Manipulation of these certificates may comprise querying the computer as to whether a particular certificate is present, adding a new certificate, removing a certificate, revoking a certificate, exporting a certificate, retrieving a certificate, and enabling a certificate (e.g., allowing a certificate intended for use by one service to be accessed by another service). The remote manipulation may be provided via a remote procedure call (RPC), an inter-process communication technology that allows a computer program to cause a subroutine or procedure to execute in another address space (commonly on another computer on a shared network) without the programmer explicitly coding the details for this remote interaction.

Further consistent with embodiments of the invention, computers may analyze their certificate stores and resolve any problems with missing and/or outdated certificates. For example, a new server being brought online in a multi-computer environment may not have copies of all the certificates it may need to interact with other computers in the environment and/or with computers outside the environment, such as may be associated with other organizations. The new server may be able to analyze its own certificate store, determine which other machines are its nearest peers, and request copies of the needed certificates. Similarly, one computer may determine that a particular certificate is no longer needed and remove it. This determination may be shared with peer computers, which may then also remove their copies of the outdated certificate.

Certificates may be associated with automatic processes executing on a computer, such as services and/or daemons. Such processes may comprise a long-running executable software application that may perform specific functions and that may be designed not to require user intervention. Processes may be configured to start when the operating system is first booted and may run in the background as long as system is running and/or they may be started manually when required.

FIG. 1 is a block diagram of an operating environment 100 comprising first a plurality of servers 110(A)-110(C), each comprising a respective certificate store 112(A)-112(C), at a first location 115 in communication over a first local area network (LAN) 120. LAN 120 may be connected to at least one second location 125 via a first gateway 130 connected to a wide area network (WAN) 140. WAN 140 may comprise a public network in communicative connection with a plurality of computers and/or organizations, such as the Internet. Second location 125 may comprise a second gateway 150 connecting WAN 140 to a second LAN 160. A second plurality of servers 170(A)-170(C), each comprising a respective certificate store 172(A)-172(C) may be connected to second LAN 160 and may be in communicative connection with first plurality of servers 110(A)-110(C). First plurality of servers 110(A)-110(C) and second plurality of servers 170(A)-170(C) may each comprise, for example, groups of mail servers at different geographic locations. For example, first location 115 may comprise a business' office in Denver, Colo. while second location 125 may comprise the business' office in Seattle, Wash.

Figure 2:
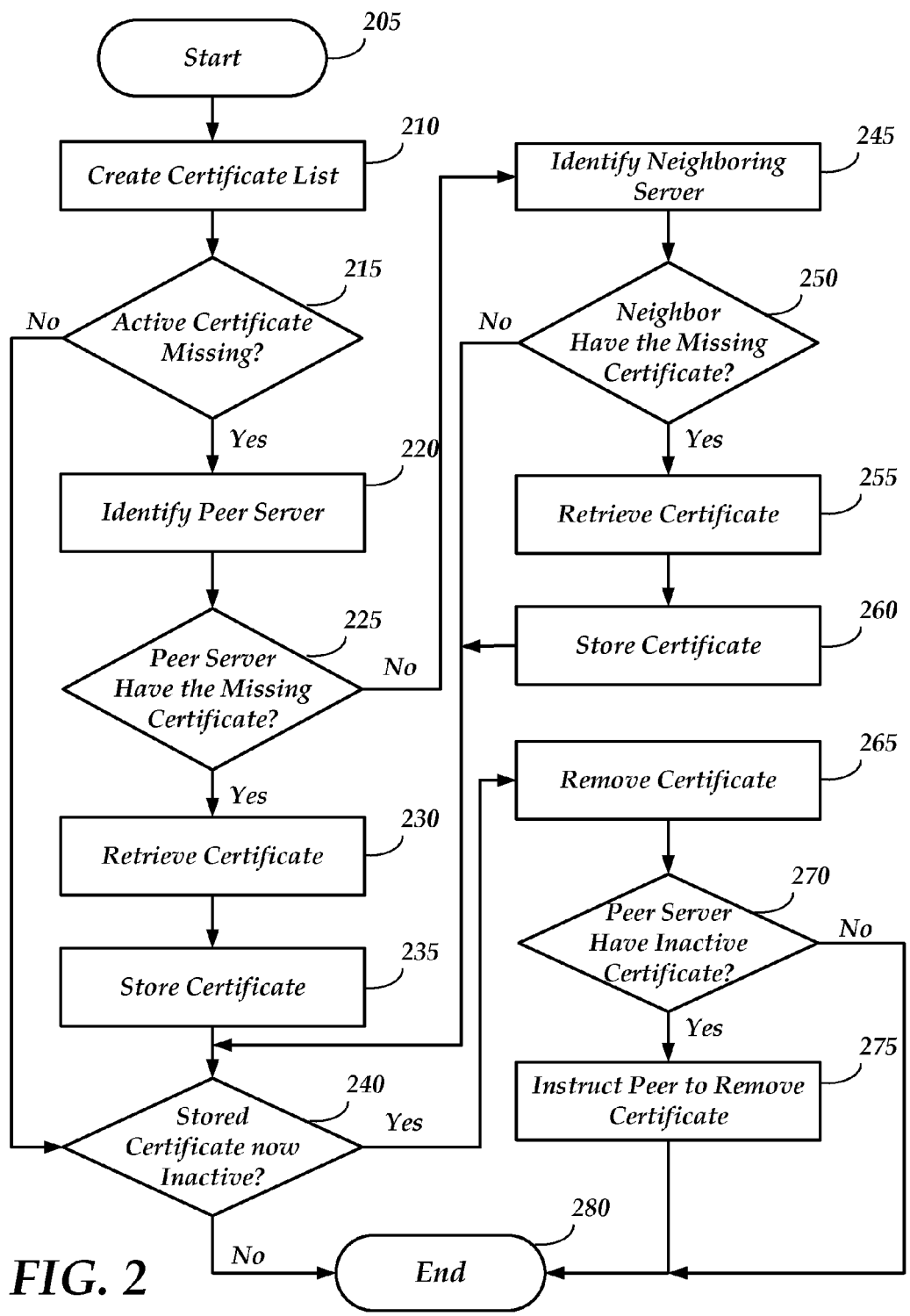
FIG. 2 is a flow chart of a method for providing certificate recovery.

FIG. 2 is a flow chart setting forth the general stages involved in a method 200 consistent with an embodiment of the invention for providing certificate remoting and recovery. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may create a list of a plurality of active security certificates. For example, the list of active security certificates may be created according to a certificate thumbprint. An automated process such as a service may be associated with at least one thumbprint comprising an array of certificate identifiers and/or signatures. Each thumbprint may list active certificates needed by the associated service to operate properly. The created list may comprise all of the certificates needed by multiple services, as read from multiple thumbprints.

Method 200 may then advance to stage 215 where computing device 400 may determine whether at least one of the plurality of active security certificates is not stored on a memory storage of computing device 400. For example, server 110(A) may analyze respective certificate store 112(A) and determine whether any of the certificates in the list created from the thumbprint(s) are missing.

If, at stage 215, computing device 400 determines that at least one active certificate is missing, method 200 may advance to stage 220 where computing device 400 may identify at least one peer server. For example, server 110(A) may identify server 110(B) and server 110(C) as peer servers due to their common presence on first LAN 120. The servers may be identified as peers due to their geographic proximity, such as all being present at first location 115.

Method 200 may then advance to stage 225 where computing device 400 may determine whether at least one of the identified peer servers has the missing certificate. For example, the missing certificate may have been accidentally deleted and/or never installed on server 110(A) but may be properly installed on peer server 110(B).

In response to determining that the peer server has the missing certificate, at stage 225, method 200 may advance to stage 230 where computing device 400 may retrieve a copy of the missing certificate from the peer server. For example, server 110(A) may send an export request for the missing certificate via a remote procedure call (RPC) to server 110(B).

Method 200 may advance from stage 230 to stage 235, where computing device 400 may receive and store the exported copy of the missing certificate. For example, server 110(A) may import the copy of the certificate into certificate store 112(A).)

If, at stage 225, computing device 400 determines that the peer servers do not have a copy of the missing certificate, method 200 may advance to stage 245 where computing device 400 may identify at least one neighboring server. For example, server 110(A) may identify second plurality of servers 170(A)-170(C), located across first gateway 130 and/or at second location 125, as neighboring servers.

From stage 245, method 200 may advance to stage 250 where computing device 400 may determine whether one of the neighboring servers comprises the missing certificate. For example, server 110(A) may send a query action request to server 170(A) as an RPC. The query action request may comprise a request for server 170(A) to determine whether it comprises a copy of the missing certificate in its respective certificate store 170(A). The request may comprise, for example an identifier for the certificate as read from a certificate thumbprint at stage 210 that may be used by server 170(A) to locate and verify the proper certificate. If none of the neighboring servers have the missing certificate, computing device 400 may return an error (e.g., by writing an error message to a system log), and method 200 may proceed to stage 240.

If the neighboring server does have the missing certificate, method 200 may advance from stage 250 to stage 255 where computing device 400 may retrieve a copy of the certificate and then to stage 260 where computing device 400 may store the retrieved certificate. Stages 255 and 260 of method 200 may be executed by computing device 400 in substantially similar fashion to stages 230 and 235, as described above. Method 200 may then return to stage 240.

After importing and storing the certificate at stage 235, or if no certificates are determined to be missing at stage 215, method 200 may advance to stage 240 where computing device 400 may determine whether at least one stored certificate is now inactive. For example, server 110(A) may analyze the contents of certificate store 112(A) and determine whether any of the certificates therein are not in the list of active certificates created at stage 210. If not, method 200 may end at stage 280.

Otherwise, method 200 may advance to stage 265 where computing device 400 may remove the inactive certificate. For example, server 110(A) may delete the inactive certificate from certificate store 112(A). Consistent with embodiments of the invention, the certificate may be left in certificate store 112(A) and marked as inactive and/or revoked. An inactive certificate may be kept for a period of time in order to determine if it becomes active again.

From stage 265, method 200 may advance to stage 270 where computing device 400 may determine whether a peer server also comprises a copy of the inactive certificate. For example, server 110(A) may send a query action request to servers 110(B) and 110(C) to inquire as to whether any of its peer servers also have the inactive certificate. Consistent with embodiments of the invention, server 110(A) may also send such a query action request to neighboring servers 170(A)-170(C).

If the other servers do not have the inactive certificate in their respective certificate stores, method 200 may end at stage 280. Otherwise, method 200 may advance to stage 275 where computing device 400 may instruct the servers with the inactive certificate to remove the inactive certificates. For example, server 110(A) may send a remove action request to server 110(B) and/or server 170(A) via an RPC. The receiving server may delete, revoke, and/or mark inactive the identified certificate as described with respect to stage 265, above. Method 200 may then end at stage 280.

Figure 3:
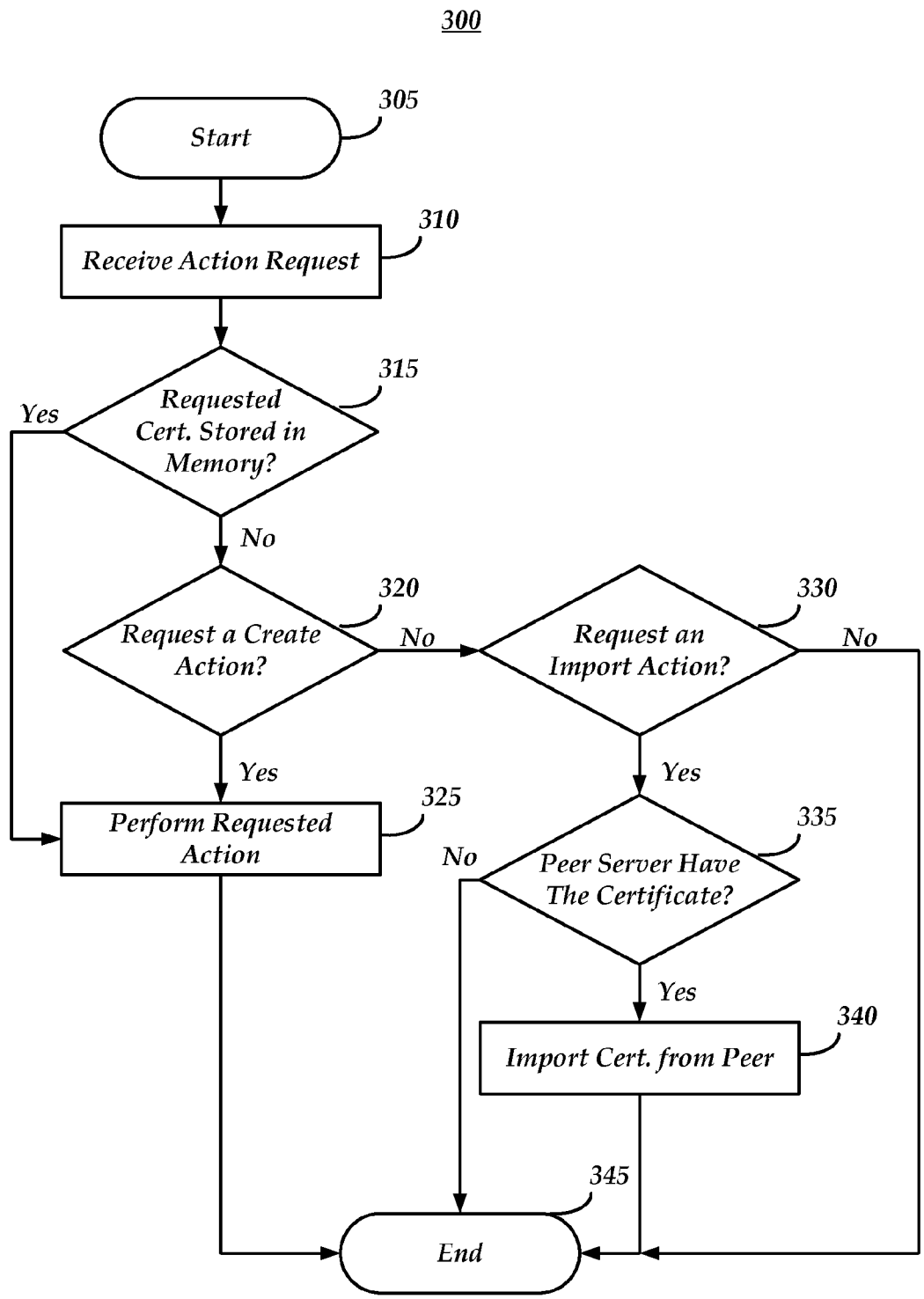
FIG. 3 is a flow chart of a method for providing remote certificate management.

FIG. 3 is a flow chart setting forth the general stages involved in a method 300 consistent with an embodiment of the invention for providing remote certificate management. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may receive an action request. For example, server 110(A) may receive a request to enable a certificate for use by a new service from server 110(B) as a remote procedure call (RPC). The request may be originated in response to an administrator's command and/or a detection by server 110(B) that the new service may require access to the certificate. For example, an email service executing on server 110(A) and server 110(B) may use a security certificate kept in respective certificate stores 112(A) and 112(B) to authenticate with an outside email delivery service (not shown). A document sharing service may be operative to provide notifications to users of the outside email delivery service, but require access to the security certificate for authentication. The enable action may modify the security certificate in such a way to indicate that the email service's security certificate may also be used by the document sharing service. Other requested actions may comprise, for example, an import action, an export action, a query action, a get action, a disable action, a revoke action, a create action, and a remove action.

Method 300 may then advance to stage 315 where computing device 400 may determine whether the certificate associated with the requested action is stored on computing device 400. For example, the request may comprise an identifier associated with the needed certificate that may be compared to identifiers associated with each of the certificates in certificate store 112(A).

If the certificate is determined not to be in the certificate store, method 300 may advance to stage 320, where computing device 400 may determine whether the request is a create action. For example, the request may comprise the information needed to create a new X.509 security certificate, such as a signing authority, a public key, a version, etc.

If the request is a create action, or if the certificate was determined to be available at stage 315, method 300 may advance to stage 325 where computing device 400 may perform the requested action. For example, server 110(A) may create a new certificate in certificate store 112(A) according to information received as part of the requested action. Method 300 may then end at stage 345.

If the request is not a create action, method 300 may advance from stage 320 to stage 330, where computing device 400 may determine whether the request is an import action. For example, server 110(A) may receive a request to import a certificate from server 110(B). If the request does not comprise an import action, method 300 may end at stage 345. Consistent with embodiments of the invention, requests to perform an action on a non-existent certificate that are not import/create actions may result in a notification being displayed on a display device, a message being written to a log associated with computing device 400, and/or an alert being sent to a user of computing device 400.

If the request is determined to comprise an import action at stage 330, method 300 may advance to stage 335 where computing device 400 may determine whether a peer server has the certificate to be imported. The import request may comprise a specific source server from which to import the certificate and/or server 110(A) may identify peer and/or neighbor servers as described above with respect to method 200. Server 110(A) may contact the specified server or an identified peer/neighbor server and determine whether the certificate to be imported is available.

If no peer or neighbor server can be found with the certificate to be imported, method 300 may end at stage 345. Consistent with embodiments of the invention, the inability to locate the certificate may result in a notification being displayed on a display device, a message being written to a log associated with computing device 400, and/or an alert being sent to a user of computing device 400.

If the certificate is located on a peer/neighbor server, method 300 may advance to stage 340 where the certificate may be copied to computing device 400. For example, server 110(A) may send an export request to server 110(B) for the certificate via an RPC. Server 110(B) may export a copy of the certificate to server 110(A) and server 110(A) may copy the certificate to its certificate store 112(A). Method 300 may then end at stage 345.

An embodiment consistent with the invention may comprise a system for providing automated certificate management. The system may comprise a memory storage and a processing unit coupled to the memory storage. The processing unit may be operative to identify security certificates used by a first server, determine whether at least one of the security certificates is not available, and, if so, identify a peer server and request the certificate from the peer server.

Another embodiment consistent with the invention may comprise a system for providing remote certificate management. The system may comprise a memory storage and a processing unit coupled to the memory storage. The processing unit may be operative to receive a request to perform an action on a security certificate from at least one remote computing system, determine whether the security certificate associated with the requested action is stored in the memory storage, and if so, perform the requested action on the security certificate.

Yet another embodiment consistent with the invention may comprise a system for providing certificate management and recovery. The system may comprise a memory storage and a processing unit coupled to the memory storage. The processing unit may be operative to create a list of active certificates and determine whether any of the active certificates are missing. If a certificate is missing, the system may identify at least one peer server and determine whether the peer server has the missing certificate. If the peer server has the certificate, the system may copy the certificate from the peer server. If the peer server does not have the certificate, the system may identify at least one neighboring server and determine whether the neighboring server has the missing certificate. The system may be further operative to identify any certificates that are no longer active, remove the inactive certificate (s), and request peer and/or neighbor servers to also remove any copies of the inactive certificate(s).

Figure 4:
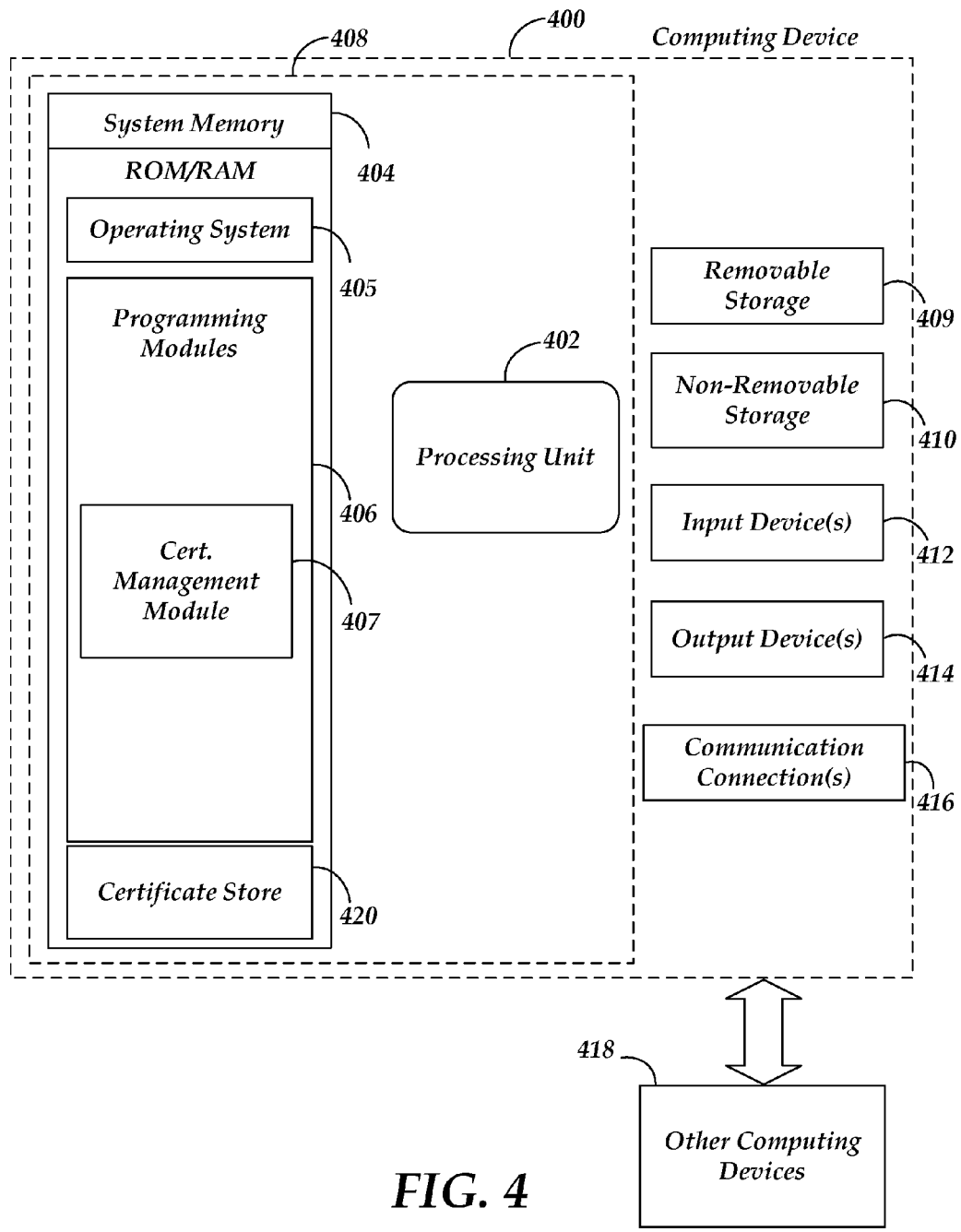
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a certificate management module 407. Operating system 405, for example, may be suitable for controlling computing device 400's operation. In some embodiments, memory 404 may comprise a certificate store 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. certificate management module 407) may perform processes including, for example, one or more of method 200's and/or method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing automated certificate management, the method comprising:
   identifying a plurality of security certificates used by a first server;
   determining whether at least one first certificate of the plurality of security certificates is one of: inactive and not available;
   in response to determining that the at least one first certificate of the plurality of security certificates is not available:
      identifying at least one peer server, and
      requesting the at least one first certificate of the plurality of security certificates from the at least one peer server; and
   in response to determining that the at least one first certificate of the plurality of security certificates is inactive:
      determining whether the at least one peer server comprises the inactive at least one first certificate, and
      remotely instructing the at least one peer server to remove the inactive at least one first certificate by sending a remove action request in response to a determination that the at least one peer server comprises the inactive at least one first certificate.

2. The method of claim 1, wherein the peer server comprises a second server located in geographic proximity to the first server.

3. The method of claim 1, wherein the peer server comprises a second server in communication with the first server via a local area network.

4. The method of claim 1, further comprising:
   determining whether the at least one first certificate of the plurality of security certificates was received from the peer server; and
   in response to determining that the at least one first certificate of the plurality of security certificates was not received from the peer server:
      identifying at least one neighboring server, and
      requesting the at least one first certificate of the plurality of security certificates from the at least one neighboring server.

5. The method of claim 4, wherein the at least one neighboring server comprises a third server in a different geographic location from the first server.

6. The method of claim 1, further comprising:
   receiving a request to manipulate at least one second certificate of the plurality of security certificates from the peer server; and
   manipulating the at least one second certificate according to the received request.

7. The method of claim 6, wherein the received request comprises at least one of the following: importing the at least one second certificate, exporting the at least one second certificate, querying for the presence of the at least one second certificate, getting the at least one second certificate, disabling the at least one second certificate, revoking the at least one second certificate, enabling the at least one second certificate, creating the at least one second certificate, and removing the at least one second certificate.

8. The method of claim 6, further comprising, wherein the received request comprises removing the at least one second certificate:
   removing the at least one second certificate;
   determining whether the at least one second certificate is in a certificate thumbprint; and
   in response to determining that the at least one second certificate is in at least one certificate thumbprint, removing the at least one second certificate from the at least one certificate thumbprint.

9. The method of claim 8, wherein identifying the plurality of security certificates used by the first server comprises retrieving a list of security certificates associated with the at least one certificate thumbprint.

10. The method of claim 9, wherein the at least one certificate thumbprint is one of a plurality of certificate thumbprints associated with the first server.

11. The method of claim 10, where each of the plurality of certificate thumbprints is associated with at least one automated process.

12. The method of claim 8, wherein the received request comprises modifying the at least one certificate thumbprint.

13. A system for providing remote certificate management, the system comprising:
   a memory storage; and
   a processing unit coupled to the memory storage, wherein the processing unit is operative to:
      receive a request to perform an action associated with a security certificate from at least one remote computing system, determine whether the security certificate associated with the requested action is stored in the memory storage, in response to determining that the security certificate associated with the requested action is stored in the memory storage, perform the requested action on the security certificate, the requested action comprising a request to remotely remove the security certificate by sending a remove action request when it is determined that the security certificate is inactive.

14. The system of claim 13, further comprising:
in response to determining that the security certificate associated with the requested action is not stored in the memory storage, determine whether the requested action comprises a create action; and
in response to determining that the requested action comprises the create action, create the security certificate in the memory storage according to the requested action.

15. The system of claim 13, wherein the requested action comprises at least one of the following: an import action, an export action, a query action, a get action, a disable action, a revoke action, an enable action, a create action, and a remove action.

16. The system of claim 13, wherein the requested action is received as a remote procedure call (RPC).

17. The system of claim 13, further comprising:
in response to determining that the security certificate associated with the requested action is not stored in the memory storage:
determine whether the requested action comprises an import action;
in response to determining that the requested action comprises the import action, determine whether at least one peer server comprises the security certificate; and
in response to determining that the at least one peer server comprises the security certificate, import the security certificate from the at least one peer server.

18. The system of claim 17, wherein being operative to import the security certificate from the at least one peer server comprises being operative to execute a remote procedure call on the at least one peer server comprising a request to perform an export action on the security certificate.

19. The system of claim 13, wherein the security certificate comprises an X.509 compliant security certificate.

20. A memory storage which stores a set of instructions which when executed by a computing device will cause the computing device to perform a method for providing certificate management and recovery, the method comprising:
creating a list of a plurality of active security certificates, wherein the list of active security certificates is created according to at least one certificate thumbprint associated with at least one automated process;
determining whether at least one of the plurality of active security certificates is not stored on the memory storage of the computing device executing the set of instructions;
in response to determining that the at least one of the plurality of active security certificates is not stored on the memory storage:
identifying at least one peer server, wherein the peer server comprises a second computing device in geographic proximity to the computing device executing the set of instructions,
determining whether the at least one peer server comprises the at least one of the plurality of active security certificates not stored on the memory storage,
in response to determining that the at least one peer server comprises the at least one of the plurality of active security certificates not stored on the memory storage:
retrieving a copy of the at least one of the plurality of active security certificates not stored on the memory storage from the peer server, and
storing the retrieved copy of the at least one of the plurality of active security certificates on the memory storage,
in response to determining that the at least one peer server does not comprise the at least one of the plurality of active security certificates not stored on the memory storage:
identifying at least one neighboring server, wherein the neighboring server comprises a third computing device located in a different geographic location from the computing device executing the set of instructions,
determining whether the at least one neighboring server comprises the at least one of the plurality of active security certificates not stored on the memory storage, and
in response to determining that the at least one neighboring server comprises the at least one of the plurality of active security certificates not stored on the memory storage:
retrieving a copy of the at least one of the plurality of active security certificates not stored on the memory storage from the neighboring server, and
storing the retrieved copy of the at least one of the plurality of active security certificates on the memory storage,
receiving a first request to query as to whether at least one security certificate stored on the memory storage is not in the list of the plurality of active security certificates;
determining that the at least one security certificate stored on the memory storage is not in the list of the plurality of active security certificates; and
receiving a second request to remove the at least one security certificate; and
remotely removing the at least one security certificate stored on the memory storage that is not in the list of the plurality of active security certificates by sending a remove action request.

* * * * *